April 28, 1964 K. E. SCHREINER 3,131,358

UNIDIRECTIONAL TRAVELING WAVE PARAMETRIC CIRCUITS USING RESONANT SECTIONS

Filed March 31, 1961 2 Sheets-Sheet 1

INVENTOR
KENNETH E. SCHREINER

BY Stephen J. Limanek
ATTORNEY

April 28, 1964 K. E. SCHREINER 3,131,358

UNIDIRECTIONAL TRAVELING WAVE PARAMETRIC CIRCUITS USING RESONANT SECTIONS

Filed March 31, 1961 2 Sheets-Sheet 2

3,131,358
Patented Apr. 28, 1964

3,131,358

UNIDIRECTIONAL TRAVELING WAVE PARAMETRIC CIRCUITS USING RESONANT SECTIONS

Kenneth E. Schreiner, Harrington Park, N.J., assignor to International Business Machines Corporation, New York, N.Y., a corporation of New York Filed Mar. 31, 1961, Ser. No. 99,746
15 Claims. (Cl. 330—4.6)

Figure 1:
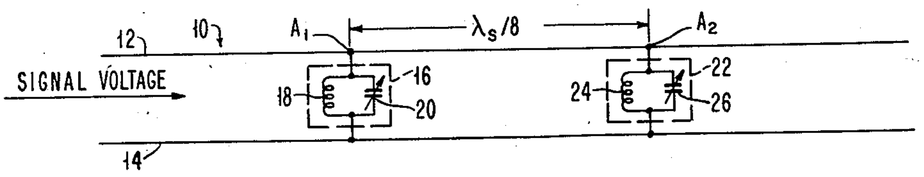

This invention relates to traveling wave circuits and more particularly to traveling wave parametric circuits.

Parametric transmission line amplifiers have been used for the amplification of high frequency signals extending into at least the X-band of the microwave region. These parametric amplifiers include reactance elements which are periodically varied in value during appropriate time intervals with respect to a propagating wave to provide amplification of that wave. The reactance elements may be either in the form of capacitors or inductors which are variable in accordance with the magnitude of a voltage, generally referred to as a pump voltage, applied to them. Amplifiers of this type have been discussed in articles, such as, "A Traveling Wave Ferromagnetic Amplifier" by Tien and Suhl in Proceedings of the IRE, April 1958, pages 700–706 and "The Variable-Capacitance Parametric Amplifier" by E. D. Reed in IRE Transactions on Electron Devices, April 1959, volume ED–6, No. 2.

In my copending U.S. patent application Serial No. 745,573 entitled "Non-Linear Resonant Apparatus and Method" which was filed on June 30, 1958, and commonly assigned, there is disclosed a parametric circuit which has a wide bandwidth and provides high gain. The parametric circuit disclosed in this copending application comprises a wave supporting structure in the form of a length of coaxial cable to which is coupled a variable reactance element, for example, a non-linear capacitance diode. The circuit is arranged so that the combination of the length of coaxial cable and the diode is resonant or nearly resonant to at least one frequency $f_1$ and neither the non-linear capacitance diode nor the wave supporting structure alone is resonant to a frequency in the neighborhood of the frequency $f_1$. The wave supporting structure considered alone constitutes predominantly a reactance which is resonated with the reactance of the non-linear capacitance diode at the frequency $f_1$. An energizing or pump wave at a frequency $f_2$ which is materially different from the frequency $f_1$ is also impressed upon the circuit. The pump wave $f_2$ in the presence of the non-linear capacitance diode operates to sustain a wave component of frequency $f_1$.

When the variable reactance element is a capacitance, the wave supporting structure is appropriately proportioned to serve as an inductance at one or more of the frequencies to be accommodated in the circuit. If on the other hand the variable reactance element is an inductance, the wave supporting structure should be proportioned to serve as a capacitance at one or more of the frequencies to be accommodated.

In a preferred embodiment of the parametric circuit disclosed in my above-mentioned copending application, the frequency of the pump wave $f_2$ is an integral multiple of the frequency $f_1$, for example, $2f_1$. By intermodulation of waves of frequency $f_2$ and waves of frequency $f_1$, the component of frequency $f_1$ is regenerated in the variable reactance element for sustaining an initial wave component of frequency $f_1$ and the resulting wave of frequency $f_1$ will be in one of a plurality of stable phases supported by the pump wave $f_2$. While an exact frequency ratio and phase relationship is necessary between the waves of frequency $f_1$ and $f_2$, respectively, the resonant frequencies of the circuit need only be approximate. The amplitude of the pump wave $f_2$ is maintained constant at a value just below a threshold value at or above which oscillations of frequency $f_1$ would be sustained. The wave component of frequency $f_1$ is generated in the circuit in amplified form by impressing an externally produced wave of frequency $f_1$ on a resonant section of the parametric circuit. The phase of the wave of frequency $f_1$, which is to be sustained at a given point in the circuit, is determined by the phase of the wave of that frequency impressed on the circuit when pump energy is initially being applied to the circuit. Furthermore, the amplitude of an impressed wave may be made sufficiently large to override the effect of waves of undesired phase of whatever origin.

This type of parametric amplifier may be arranged to have an intermediate point in the length of coaxial cable that is at a low impedance at the resonant frequency. Hence, resonance is not materially affected by loading by the application of the pump wave at this point. With proper tuning the load on the pump source can be made purely resistive, thus, providing maximum power transfer.

It is an object of this invention to provide an improved traveling wave circuit employing a resonant section.

It is another object of this invention to provide an improved iterated parametric network employing resonant sections.

It is still another object of this invention to provide an improved traveling wave circuit employing at least one variable reactance element in a resonant section.

It is a further object of this invention to provide an improved iterated parametric circuit employing resonant circuits spaced at predetermined points.

It is a still further object of this invention to provide an improved unidirectional parametric circuit including resonant sections having a wide bandpass characteristic and high gain.

Yet a further object of this invention is to provide an improved transmission line amplifier employing resonant sections which will amplify a forward moving wave but will not amplify a reverse or backward moving wave through the transmission line.

Yet another object of this invention is to provide an improved parametric amplifier employing resonant sections having its pump line separate from its signal line.

In accordance with an important aspect of this invention, an improved traveling wave circuit is provided which includes a plurality of resonant circuits each having a variable reactance element coupled to a transmission line at spaced apart points separated by distances equal to, preferably, an odd multiple of ⅛ of the wave length of a given propagating wave.

An important feature of the parametric circuit of this invention is that unidirectional high amplification of a propagating wave is obtained by spacing the resonant circuits along the transmission line at a distance equal to ⅛ of a wave length of the propagating wave or signal.

Another important feature of this invention is that the traveling wave circuit may be made reflectionless even when a plurality of segments of transmission line each having different characteristic impedances are used by properly coupling given resonant circuits to the line segments.

An advantage of this invention is that a high gain directional amplifier is provided which does not require the use of isolators, circulators, or other elements generally used in a transmission line amplifier to provide directionality. Another advantage of this invention is that this traveling wave parametric amplifier affords a great deal more flexibility in design and operating characteristics than heretofore known non-linear capacitance loaded transmission line amplifiers.

The foregoing and other objects, features and advantages of the invention will be apparent from the following more particular description of preferred embodiments of the invention as illustrated in the accompanying drawings.

Figure 2:
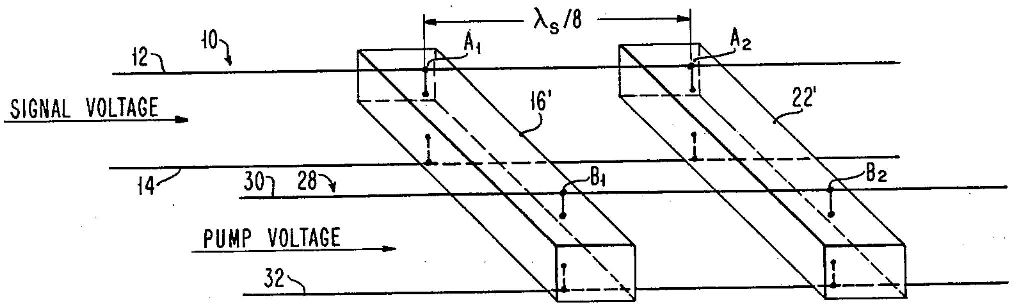
Figure 5:
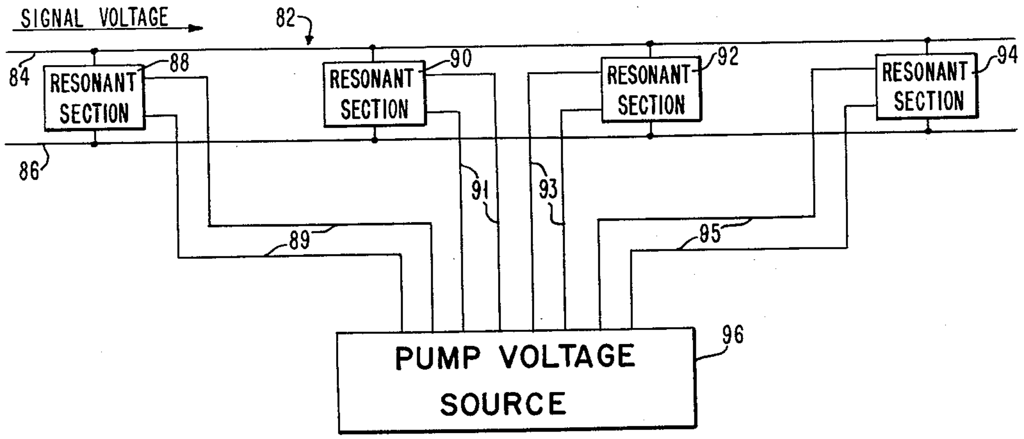
Figure 3:
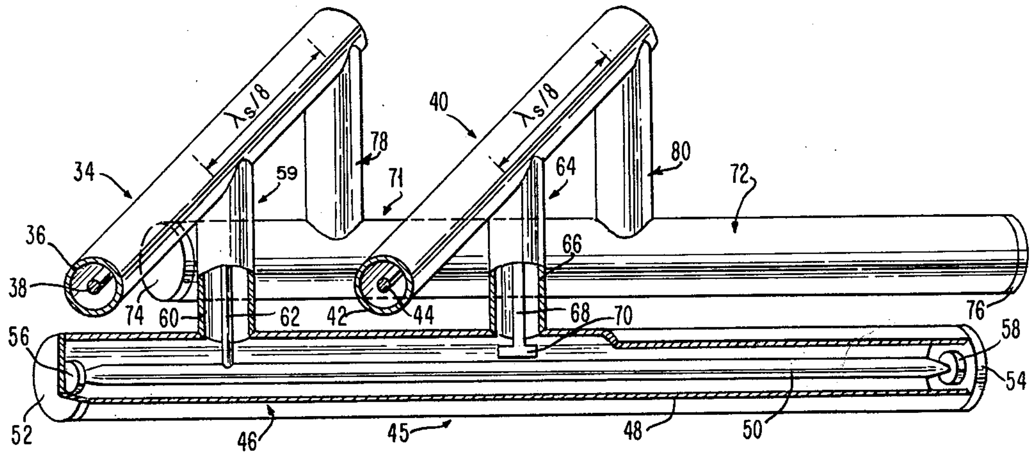
Figure 4:
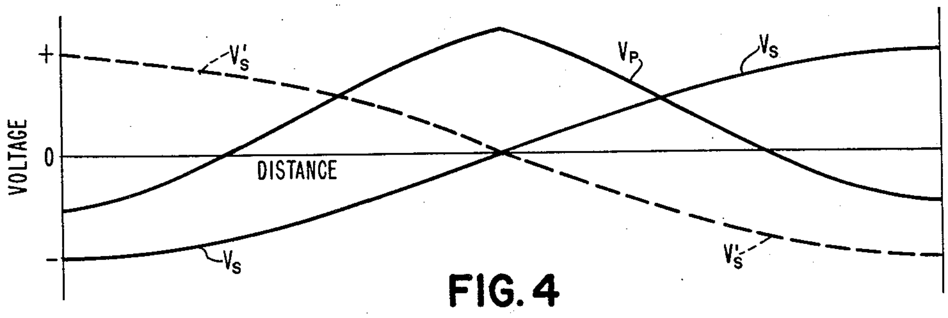
Figure 6:
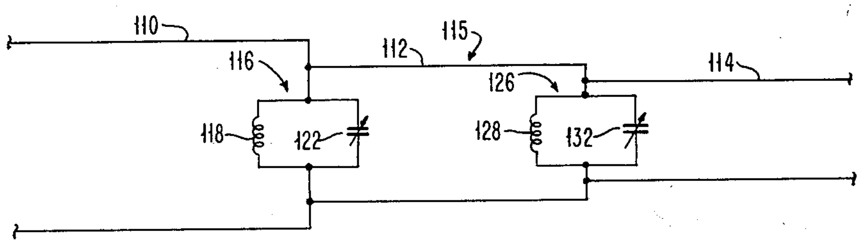

In the drawings:

FIG. 1 shows a simplified representation of the traveling wave circuit of this invention having two sections, each in the form of variable reactance resonant circuits, FIG. 2 shows a general form of a traveling wave circuit of this invention wherein the pump voltage and the signal voltage are transmitted along separate lines, FIG. 3 shows an embodiment of the traveling wave circuit of this invention utilizing resonant sections including a length of coaxial cable and a pair of non-linear capacitance diodes, FIG. 4 is a graph showing illustrative standing wave forms for one of the resonant sections of the circuit shown in FIG. 3, FIG. 5 illustrates the circuit of the present invention when each resonant section is coupled by an independent line to a common pump voltage source, and FIG. 6 illustrates an embodiment of the traveling wave circuit of the present invention in the form of a reflectionless transmission line which includes a plurality of line segments each having a different value of characteristic impedance.

Referring to the drawings in more detail, FIG. 1 illustrates a two section non-reciprocal variable-parameter circuit of the present invention which includes a transmission line 10 having a first conductor 12 and a second conductor 14 for passing a given signal voltage $V_s$ having a frequency $f_1$, for example, in the X-band of the microwave region. Coupled to the transmission line 10 at point $A_1$ is a first resonant section 16 tuned to the frequency $f_1$. The resonant section 16 includes an inductor 18 and a variable capacitor 20. At point $A_2$ spaced from the first section 16 along the transmission line 10 by a distance equal to ⅛ of the wave length of the signal voltage, $\lambda_s/8$, or an odd multiple thereof, is a second resonant section 22 also tuned to the frequency $f_1$. The second amplifier section 22 includes an inductor 24 and a variable capacitor 26. Each of the two variable capacitor 20, 26 may be non-linear capacitance diodes and may be varied by any known suitable means, such as by applying a pump voltage thereto. The signal voltage $V_s$ is amplified at the resonant section 16 when the variable capacitance is varied sinusoidally at a frequency substantially higher than the frequency $f_1$, and preferably at a frequency equal to $2f_1$, with the proper phase relative to the phase of the signal voltage $V_s$ in accordance with well-known parametric principles. The pump voltage phasing is such that maximum amplification of the signal voltage $V_s$ occurs at the second resonant section 22 about ⅛ of a wave length, $\lambda_s/8$, later than maximum amplification at the first resonant circuit 16.

The signal voltage traveling along the transmission line 10 sees discontinuities at each of the two resonant sections 16, 22 which produce multiple reflections and, due to the difference in phase of the pump voltage at the first and second resonant sections 16 and 22, the circuit appears different to signal energy traveling from point $A_2$ to point $A_1$ than it does to signal energy traveling from point $A_1$ to point $A_2$. After the signal voltage $V_s$ is amplified at point $A_1$ of transmission line 10 to which point the resonant circuit 16 is coupled, a component thereof is transmitted through the transmission line 10 to point $A_2$ where it is again amplified. Although a component of the amplified voltage at point $A_2$ is transmitted along the transmission line 10 toward the output end of the circuit, another component of this amplified voltage travels in the opposite direction along the transmission line 10 to point $A_1$. The component of the amplified voltage returning from point $A_2$ to $A_1$ is partially reflected from point $A_1$ and continues to undergo successive partial reflections at points $A_1$ and $A_2$. The component of each partial wave which is transmitted past $A_2$ contributes to the total output. As mentioned hereinabove, the spacing between the resonant circuits 16 and 22 along the transmission line 10 is equal to ⅛ of the wave length of the signal voltage $V_s$, or a multiple thereof. This spacing is provided so that the circuit amplifies signal energy traveling in the forward direction, that is, from point $A_1$ to point $A_2$, while not effectively amplifying the signal energy traveling in the reverse direction, that is, from point $A_2$ to point $A_1$. To better understand the reason for providing the $\lambda_s/8$ spacing between the resonant circuits 16 and 22, consider the pump voltage $V_p$ as being applied to the second resonant section 22 ⅛ of a signal voltage $V_s$ wave length after being applied to the first resonant section 16 and the signal voltage $V_s$ traveling along the transmission line 10 from point $A_2$ to point $A_1$. The phase of the pump voltage $V_p$ relative to the signal voltage $V_s$ at point $A_1$ is then 90 degrees different from the relationship existing at the resonant section 22. Thus, if the phase relation of the pump and signal voltage is such that maximum amplification takes place at the second resonant section 22, the backward flowing component of the signal energy will be attenuated at the first resonant section 16, as explained in more detail in the above mentioned Reed article. Therefore, the amplifying effect of one resonant section is offset by the next resonant section when the signal energy is traveling in the reverse direction. If an even number of resonant sections are spaced along the transmission line 10 at spaced apart points equal to a distance which is a multiple of ⅛ of the wave length of the signal voltage $V_s$, it can be seen that the gain of the signal energy flowing in the reverse direction is only of the order of unity. The voltage gain of the signal energy of favorable input phase flowing in the forward direction in one of the circuits of the present invention was found to be 5.5, and the bandwidth was 18%. For unfavorable, or quadrature with respect to the favorable, phase the voltage gain is only .88. Thus, it can be seen that a directional traveling wave parametric amplifier has been provided which provides high gain, discriminating not only with respect to direction but also to phase.

FIG. 2 shows an embodiment of the amplifier of the present invention wherein the signal voltage and the pump voltage are transmitted through separate transmission lines. FIG. 2 shows point $A_1$ of the signal voltage transmission line 10 coupled to a first resonant section 16' and point $A_2$ coupled to a second resonant section 22'. A transmission line 28 having a first conductor 30 and a second conductor 32 for transmitting a pump voltage $V_p$ having a frequency substantially higher than the frequency of the signal voltage $V_s$, and preferably twice the frequency of the signal voltage $V_s$, is coupled at point $B_1$ to the first resonant section 16' and at point $B_2$ to the second resonant section 22'. The point $B_1$ and $B_2$ are spaced apart a distance equal to ⅛ of the wave length of the signal voltage $V_s$, or an odd multiple thereof so as to be equal to the distance between points $A_1$ and $A_2$.

FIG. 3 shows a somewhat detailed embodiment of the circuit of the present invention employing the principles of the circuits illustrated in FIGS. 1 and 2 of the drawing. The variable reactance transmission line circuit of the present invention shown in FIG. 3 includes a first coaxial transmission line 34 for transmitting a signal voltage $V_s$ of the frequency $f_1$ and having a characteristic impedance $Z_{01}$. The coaxial transmission line 34 includes an outer cylindrical conductive sheath 36 and an inner conductor 38. A second coaxial transmission line 40 is provided for transmitting the pump voltage $V_p$ having a frequency $f_2$ equal to, preferably, twice the frequency of the signal voltage $V_s$. The second coaxial transmission line 40 includes an outer cylindrical conductive sheath 42 and an inner conductor 44. The circuit shown in FIG. 3 also comprises a first resonant section 45 having a characteristic impedance $Z_{02}$ which is less than $Z_{01}$ and including a first section of coaxial cable 46 having an outer cylindrical conductive sheath 48 and an inner conductor 50. The sheath 48 of the first section 46 is terminated at both of its ends by conductive end plates 52 and 54, respectively. First and second non-linear reactance means, such as non-linear capacitance diodes 56 and 58 are conductively connected at one surface thereof to the end plates 52 and 54, respectively. The ends of the inner conductor 50 of the first section of coaxial cable 46 are conductively connected to the surfaces of the respective diodes which are opposite the surfaces connected to the end plates 52 and 54.

The first section of coaxial cable 46 is connected at a point intermediate the ends thereof, which point is to identified more specifically hereinbelow, to the first coaxial transmission line 34 through a first length of coaxial cable 59. An outer cylindrical conductive sheath 60 of the first short length of coaxial cable 59 is connected to the outer cylindrical conductive sheath 48 of the first section of coaxial cable 46 and an inner conductor 62 of the first short length of coaxial cable 59 is connected directly to the inner conductor 50 of the first section of coaxial cable 46. The first section of coaxial cable 46 is also coupled at another point intermediate the ends thereof, which point is also to be identified more specifically hereinbelow, to the second coaxial transmission line 40 through a second short length of coaxial cable 64. An outer cylindrical conductive sheath 66 of the second short length of coaxial cable 64 is conductively connected to the outer cylindrical conductive sheath 48 of the first section of coaxial cable 46. An inner conductor 68 of the second short length of coaxial cable 64 extends into the interior of the first section of coaxial cable 46 and is terminated in a large end portion 70 for providing a suitable capacitance coupling with the inner conductor 50 of the first section of coaxial cable 46.

A second resonant section 71 including a second section of coaxial cable 72 similar to the first section of coaxial cable 46 and including a pair of diodes (not shown) and end plates 74, 76 similarly arranged is coupled to the first and second coaxial transmission lines 34 and 40 through third and fourth short lengths of coaxial cable 78, 80, respectively.

It should be understood that if desired, the coaxial lines of the circuit illustrated in FIG. 3 of the drawing may be replaced by suitable strip transmission lines e.g., of the type described in a commonly assigned copending application having Serial No. 824,003, filed June 30, 1959, by George F. Bland. It also should be understood that the length of the first and third lengths of coaxial cable 59 and 78 which connect the first and second resonant sections 45 and 71 to the first coaxial transmission line 34 should substantially be shorter than $\lambda_s/8$.

In order to more clearly understand the operation of the circuit shown in FIG. 3, a graph illustrating the standing waves which are produced in the first and second sections of coaxial cable 46 and 72 is provided in FIG. 4. The magnitude and phase of one signal voltage produced between the end plates 52 and 54 is indicated by line $V_s$ and the magnitude and phase of the pump voltage applied between the end plates 52 and 54 is indicated by the line $V_p$. A second signal voltage 180 degrees out of phase with the signal voltage $V_s$ may also be produced between the end plates 52 and 54 and this voltage is indicated by the dashed line $V'_s$.

In the operation of the circuit shown in FIG. 3 of the drawing the diodes 56 and 58 constitute lumped non-linear elements providing the capacitance C of the resonant section 45, which section is operated as an amplifier section, the pump voltage amplitude being maintained constant at a value below a given threshold value at which oscillations would be sustained in the circuit. The inductance L is provided by the transmission line structure, shown in FIG. 3 as the first section of coaxial cable 46 terminated at each end by a pair of diodes 56 and 58. The half length of the cable 46 may be designated by $l$ and is the distance between one of the diodes 56 and 58 and the point in the first section of cable 46 at which the inner conductor 68 of the second short length of coaxial cable 64 is introduced. A typical length for $l$ is ⅛ of the wave length of the signal voltage $V_s$, that is, $$l=\frac{\lambda_s}{8}$$

The values of $l$ in a range from say $\frac{1}{16}$ to $\frac{3}{16}\lambda_s$, may be used.

If greater physical length is not undesirable, any number of half wave lengths of $\lambda_s$ may be added to the full length of the section of coaxial cable 46 but for greatest band width $$l\ll\frac{\lambda_s}{4}$$

The values of the half length of the cable which give capacitive reactance do not typically produce resonance with the capacitance C. If $l$ is close to a quarter wave length, the capacitance required for resonance may be too small for practical use. The first section of coaxial cable 46 will be considered to represent a transmission line having a full length $2l$ which is equal to $\lambda_s/4$. To analyze the resonant section 45 from the standpoint of the resonant frequency, it is convenient to consider the transmission line consisting of the first section of coaxial cable 46 initially as divided into two parts by means of a short circuit across the center, that is, at the plane perpendicular to the inner conductor 50 of the first section of coaxial cable 46 through the inner conductor 68 of the second short length of coaxial cable 64. Then each diode 56, 58 is in parallel relationship to a transmission line of length $\lambda_s/8$ short circuited at the end of the line remote from the position of the diode. According to known transmission line theory, the impedance working into the short circuited line from the location of the diode is $$jZ_{02}\tan 2\pi\frac{l}{\lambda_s}$$

where $Z_{02}$ is the characteristic impedance of the transmission line 46 and $j$ indicates that the impedance is a pure reactance. For the line of length $\lambda_s/8$, i.e., length $l$, the half length of the first section of coaxial cable 46, the value of the impedance is simply $jZ_{02}$.

The capacitance C of each of the diodes may be represented by $C=C_0+\Delta C\sin 2\omega t$, where $C_0$ is the fixed value of the capacitance and $\Delta C$ is the variation of the capacitance. The value of $C_0$ necessary to resonate with the short circuited line of length $\lambda_s/8$ at the frequency $f_1$ is given by the known resonance formula $$\sqrt{LC_0}=\frac{1}{2\pi f_1}$$

where L is the inductance of the portion of the line 46 between one end and the middle thereof. When so resonated by the capacitance of the diode, the line has a voltage node at the short circuited end. Hence, two such resonated lines may be placed with short circuited ends together and then, since a voltage node exists where the short circuit is located, the short circuit may be removed, giving as a result the configuration of the system shown in FIG. 3. The waves at the two ends of the line differ in phase by 180 degrees and the voltage node at the midpoint of line 46 is, therefore, a point of low impedance at the resonant frequency $f_1$. In the graph shown in FIG. 4, the solid line $V_s$ represents the distribution of maximum electric field intensity along the length of the first section of coaxial cable 46 for one of the two stable phases for waves of the resonant frequency $f_1$. The other stable phase is represented by the dashed line $V'_s$. It should be noted that the diodes are located in regions of relatively high electric field intensity for the frequency $f_1$.

In accordance with the present invention, the diodes 56, 58 are subjected not only to a wave of frequency $f_1$ but also to a pump wave $V_p$ having a frequency $f_2$ preferably equal to $2f_1$. It is desirable that the pump waves $V_p$ have the least possible distributing or loading effects upon waves and resonant circuit of frequency $f_1$. This result may be achieved by impressing the waves $V_p$ upon the first section of coaxial cable 46 at the nodal point of the signal wave $V_s$ by the second short length of coaxial cable 64 through the capacitive coupling formed by the inner conductor 50 and the end portion 70 of the inner conductor 68.

In many cases of particular interest the frequency $f_2$ of the wave $V_p$ is considerably greater than the frequency $f_1$. Then the reactance of the diode is less at the frequency of the pump wave $V_p$ than at the frequency of the signal wave $V_s$ and, therefore, at the frequency $f_2$ of the pump wave $V_p$ a voltage node will be present at some point in the first section of coaxial cable 46 between the diode and the voltage node for the wave $V_s$, i.e. between an end and the center of the first section of coaxial cable 46. By considering FIGS. 3 and 4 together, the first short length of coaxial cable 59 can be seen coupled to the first section of the coaxial cable 46 at a voltage node for the wave $V_p$ intermediate the diode 56 and the voltage node for the wave $V_s$, since the line $V_p$ in FIG. 4 of the drawing, having a discontinuity at the center, represents the distribution of the field intensity along the first section of coaxial cable 46 for standing waves of the pump voltage frequency $f_2$.

The impedance at the frequency of the wave $V_p$ looking into the second short length of coaxial cable 64 is in general reactive but this reactance may be neutralized, that is, tuned out as by means of a tuning reactor which in the case of an inductive reactance when looking into the second short length of coaxial cable 64 is tuned out by the capacitance formed by the inner conductor 50 and the end portion 70 of the inner conductor 68. Thus, the energizing or pump wave $V_p$ will be applied to a substantially pure resistive load.

In the event that the diodes 56, 58 require biasing either to adjust them to the proper value of capacitance or to achieve fine tuning of the resonant section, or for any other reason, known biasing means may be provided as disclosed in detail in my above identified copending application.

When the pump voltage $V_p$ has a magnitude which is below the threashold value at which oscillations will be sustained in the resonant section 45, the resonant section 45 is in condition to amplify signals applied thereto through the first short length of coaxial cable 59. When the signal voltage $V_s$ of frequency $f_1$ is passing through the first transmission line 34 in a forward direction so as to be applied to the first resonant section 45 and then to the second resonant section 71, the first resonant section 45 produces a standing wave $V_s$ shown in FIG. 4 corresponding to the wave of the applied signal voltage $V_s$ having the phase indicated therein, and at a later time a similar standing wave will be produced in the second resonant section 71. If the phase of the applied signal voltage is opposite to or 180 degrees different than the phase of the signal voltage $V_s$, the standing wave produced in the resonant sections 45 and 71 will take the form indicated by line $V'_s$ in FIG. 4. The input line to and the output line from the resonant section 45 is the first short length of coaxial cable 59. Thus, an amplified signal voltage from the first resonant section 45 is applied to the first transmission line 34 at its junction point with the first short length of coaxial cable 59. From this junction point one component of the amplified signal voltage travels through the first transmission line 34 toward the second resonant section 71 and another component travels toward the input end of the first transmission line 34. The component traveling toward the second resonant section 71 is applied thereto and is amplified therein in a manner similar to that described in connection with the operation of the first resonant section 45. The amplified signal voltage from the second resonant circuit 71 is applied to the first transmission line 34 at its junction point with the third short length of coaxial cable 78, from which point components of the signal voltage travel in a forward direction to subsequent additional resonant sections (not shown) and in a reverse direction to the preceding or first resonant section 45 to be amplified or attenuated in the manner described hereinabove in connection with the operation of FIG. 1 of the drawing.

One of the additional properties and advantages of the variable reactance transmission line circuit of the present invention is that each section of the circuit may be driven by a separate pump line originating at a common source as illustrated in FIG. 5 of the drawing. Transmission line 82 having first and second conductors 84 and 86, shown in FIG. 5, has a plurality of amplifier sections 88, 90, 92 and 94 coupled thereto at spaced apart points. A common pump voltage source 96 is coupled directly to each of the plurality of resonant sections 88, 90, 92 and 94 by lines 89, 91, 93 and 95, respectively. The advantage of the arrangement shown in FIG. 5 is that the pump power from the pump voltage source 96 can be applied equally to each of the plurality of sections 88, 90, 92 and 94, whereas in the arrangements illustrated in FIGS. 2 and 3, the circuit having one continuous line with distributed loading, the pump power decreases progressively in the direction of propagation of the pump voltage. This effect becomes particularly important when the non-linear elements are significantly dissipative or when the signal power is large.

FIG. 6 illustrates the traveling wave or variable reactance transmission line circuit of the present invention as a reflectionless subharmonic amplifier wherein the signal transmission line has a plurality of segments having different characteristic impedances. FIG. 6 shows first, second and third segments 110, 112 and 114 of a signal transmission line 115 and a first amplifier section 116 including an inductor 118 connected in parallel with a non-linear capacitance diode 122. The amplifier section 116 is coupled to the junction point of the first and second segments 110 and 112 of the signal transmission line 115. A second amplifier section 126 includes an inductor 128 connected in parallel with a non-linear capacitance diode 132. The second amplifier section 126 is coupled to the junction point between the second and third segments 112 and 114 of the signal transmission line 115.

Each of the variable capacitance diodes of the first and second amplifier sections 116 and 126 may be considered as having a capacitance C such that $$C=C_0[1+\rho \sin (2\omega t+2\theta)]$$

where $C_0$ is the fixed capacitance component of diodes 122 and 132 of the first and second amplifier sections 116 and 126 of the circuit shown in FIG. 6 and $\rho C_0 \sin (2\omega t+2\theta)$ is the variable capacitance component of diodes 122 and 132, $\rho$ being the amount of change of capacitance $\Delta C$ produced by a pump voltage $V_p$ divided by the fixed component $C_0$, $\theta$ may be considered as the phase difference between the signal voltage $V_s$ and the pump voltage $V_p$ at a point on the transmission line 115 to which the amplifier section is connected, when the pump voltage $V_p$ applied to the amplifier section has a frequency equal to $2f_1$, that is, twice the frequency of the signal voltage $V_s$ and $\omega$ being equal to $2\pi f_1$. The inductor 118 or 128 is chosen to have a value L so as to resonate out the fixed capacitance component $C_0$ at the frequency $f_1$. If the signal voltage $V_s$ is small compared to the pump voltage $V_p$, the admittance of each of the variable capacitance diodes may be determined from the equation $$Y_C=j\omega C_0+j\frac{\rho}{2}\omega C_0 \sin 2\theta-\frac{\rho}{2}\omega C_0 \cos 2\theta$$

Since $$Y=Y_L+Y_C$$

if $\theta$ is equal to 0, 180, 360 etc., the admittance is reduced to $$Y=G=-\frac{\rho}{2}\omega C_0$$

the first capacitive component being resonated out by the inductor 118 or 128. If $\theta$ is equal to 90, 270, 450 etc., the admittance becomes $$Y=G=+\frac{\rho}{2}\omega C_0$$

It can readily be seen that the sign of the admittance is dependent upon the phase relationship between the pump and signal voltages.

The admittance of the first segment 110 of the signal transmission line may be designated as having a value $G_{01}$, the second segment 112 as having an admittance value $G_{02}$ and the third segment 114 as having an admittance value $G_{03}$. It has been found that by adjusting the value of the admittance of the first amplifier section 116 to an appropriate negative admittance $-G_{X1}$ such that $G_{01}=G_{02}-G_{X1}$ the junction between the first and second segments 110 and 112 having different characteristic impedances will be reflectionless. Likewise, when the second amplifier section 126 has a negative admittance $-G_{X2}$ such that $G_{02}=G_{03}-G_{X2}$ the junction between the second and third segments 112 and 114 of the signal transmission line 115 having different characteristic impedances will be reflectionless. Thus, the electric field at the output of the signal transmission line in the circuit of the present invention is the same as that at the input thereof. This arrangement, therefore, provides a reflectionless power amplifier and an impedance transformer.

The operation of the circuit illustrated in FIG. 6 does not require any particular spacing between the amplifier sections or break points in the signal transmission line. It should be understood, however, that the characteristics of the circuit with respect to isolation and phase discrimination are affected by the spacing of the resonant sections. For example, if the spacing between the first and second amplifier sections 116 and 126 is equal to $\lambda_s/4$ and the first and second amplifier sections 116 and 126 have a negative admittance equal to $|G_{02}-G_{01}|$ and $|G_{03}-G_{02}|$, respectively, the signal moving through the transmission line 115 in the forward direction, that is, from the first amplifier section 116 to the second amplifier section 126, will be amplified without reflection at any point in the transmission line 115. However, if the first amplifier section 116 has a positive admittance, the forwardly moving signal will be attenuated and reflected in the transmission line 115. If the first and second amplifier sections 116 and 126 have a positive admittance equal to $|G_{02}-G_{01}|$ and $|G_{03}-G_{02}|$, respectively, a signal moving in the reverse direction will not be amplified nor reflected in the transmission line 115. When the second amplifier section 126 has a negative admittance, the rearwardly moving signal will be attenuated and reflected in the transmission line 115. When the value of the admittance of the second amplifier section 126 is negative and equal to the admittance of the second segment 112 of the transmission line 115, the reverse signal will be totally reflected.

If the spacing between the first and second amplifier sections 116 and 126 is equal to $\lambda_s/8$ and the first amplifier sections 116 and 126 have a negative admittance of the proper magnitude, the forward signal will be amplified without reflection. When the first amplifier section 116 has a positive admittance, the forward signal will be attenuated and reflected in the transmission line 115. When the second amplifier section 126 has either a positive or negative admittance, the reverse signal will be attenuated and reflected in the transmission line 115. If the admittance of the second amplifier section 126 is negative and equal to the admittance of the second segment 112 of the transmission line 115, the reverse signal will be totally reflected, as it was under these conditions when the spacing between the first and second amplifier sections 116 and 126 was equal to $\lambda_s/4$. Thus, it can be seen that it is possible to arrange in a transmission line having segments of different characteristic impedance for a signal flowing in the forward direction to be amplified without reflection and for a signal flowing in the reverse direction to be attenuated without reflection. It should be further understood that the iterative amplifier sections may be spaced along any length of transmission line with substantially any desired frequency.

Accordingly, it can be seen that the variable reactance transmission line circuit of the present invention may be arranged and adjusted to perform numerous functions, for example, as long lines with non-uniform spacing, miscellaneous gating amplifiers, switches, oscillators and isolating elements as well as amplifiers having phase and directional properties, and the resonant sections employed in the circuit may be adjusted to repeat or to amplify an impressed wave with any desired degree of regenerative effect.

While the invention has been particularly shown and described with reference to preferred embodiments thereof, it will be understood by those skilled in the art that various changes in form and details may be made therein without departing from the spirit and scope of the invention.

What is claimed is:

1. A traveling wave parametric circuit comprising a transmission line having input and output ends for transmitting signal energy at a given frequency, a pair of resonant circuits each having a variable reactance element and each tuned to said given frequency and coupled to said transmission line between said ends at spaced apart points separated by a distance equal to substantially an odd multiple of ⅛ of the length of a wave of the given frequency and means for varying the reactance of said variable reactance element at a frequency substantially twice that of said given frequency by continuously exciting said elements below a threshold point at which oscillations at said given frequency are sustained in said resonant circuits.

2. A traveling wave parametric circuit comprising a transmission line having input and output ends for transmitting a signal voltage having a given frequency, a pair of resonant circuits each having a variable capacitance and an inductor and each tuned to said given frequency and coupled to said transmission line between said ends at points spaced apart by a distance substantially equal to an odd multiple of ⅛ of the length of the signal voltage and means for continuously applying a pump voltage to said variable capacitance to vary the capacitance thereof at a frequency substantially twice that of said given frequency by exciting said capacitances below a threshold point at which oscillations at said given frequency are sustained in said resonant circuits.

3. A traveling wave parametric circuit comprising a transmission line having input and output ends for transmitting a signal voltage having a given frequency, a pair of resonant circuits each having a non-linear capacitance diode and an inductor and each tuned to said given frequency and coupled to said transmission line between said ends at spaced apart points equal to an odd multiple of ⅛ of a wave length of the signal voltage and means for continuously applying a pump voltage having a magnitude less than a threshold magnitude at which oscillations at said given frequency are sustained in said resonant circuits to each of said diodes to vary the capacitance thereof at a frequency substantially twice that of said given frequency.

4. A traveling wave parametric circuit comprising a first transmission line having input and output terminals for transmitting a signal voltage having a given frequency, a pair of resonant circuits each having a variable reactance element and each tuned to said given frequency and coupled to said transmission line between said terminals at spaced apart points separated by a distance equal to an odd multiple of ⅛ of a wave length of the signal voltage and a second transmission line having input and output terminals for transmitting a pump voltage at a frequency substantially twice that of said given frequency, said resonant circuits being coupled to said second transmission line between the terminals thereof at spaced apart points separated by a distance equal to an odd multiple of ⅛ of a wave length of the signal voltage, said transmission line points being further located so as to provide a phase relationship between said signal and pump voltages at which parametric effects produce sustained oscillations at said given frequency in said resonant circuits.

5. A traveling wave parametric circuit comprising a transmission line having input and output terminals for transmitting a signal voltage at a given frequency, a pair of resonant circuits each having a variable reactance element and each tuned to said given frequency and coupled to said transmission line between said terminals at spaced apart points separated by a distance equal to an odd multiple of ⅛ of a wave length of the signal voltage, a source of pump voltage having a frequency substantially twice that of said given frequency and means for independently coupling each of said resonant circuits directly to said pump voltage source, said pump voltage being applied to said resonant circuits so as to provide a phase relationship between said pump and said signal voltages at which parametric effects produce sustained oscillations at said given frequency in said resonant circuits.

6. A traveling wave parametric circuit comprising a transmission line having input and output ends for transmitting a signal voltage having a given frequency, a pair of shunt resonant circuits coupled to said transmission line between said ends at spaced apart points equal to an odd multiple of ⅛ of a wave length of the signal voltage, each of said pair of resonant circuits including a section of coaxial cable having an outer cylindrical conductive sheath and an inner conductor, the characteristic impedance of said section of coaxial cable being less than the characteristic impedance of said transmission line, a conductive end plate electrically connected to each end of said outer cylindrical sheath, a variable reactance element intercoupling said inner conductor and one of said end plates for producing standing waves in said section of coaxial cable having a wave length equal to the wave length of said signal voltage, and means for continuously applying a pump voltage having a magnitude less than a threshold magnitude at which oscillations at said given frequency are sustained in said resonant circuits to each of said sections of coaxial cable to vary the reactance of said variable reactance elements at a frequency twice that of the frequency of said signal voltage.

7. A traveling wave circuit as set forth in claim 6 wherein said variable reactance element is a nonlinear capacitance diode.

8. A traveling wave circuit as set forth in claim 6 wherein the pump voltage is applied to said section of coaxial cable at a point corresponding to a nodal point of the standing wave.

9. A traveling wave circuit as set forth in claim 8 wherein said signal voltage from said transmission line is applied to said section of coaxial cable at a point corresponding to a nodal point of a standing wave produced therein having a wave length equal to the wave length of the pump voltage.

10. A traveling wave circuit as set forth in claim 9 further including capacitive coupling means for applying said pump voltage to said section of coaxial cable.

11. A traveling wave circuit comprising a transmission line having input and output terminals for transmitting a signal voltage having a given frequency, a pair of parallel resonant circuits each having a variable capacitance and an inductor and each tuned to said given frequency and coupled to said transmission line between said terminals at spaced apart points equal to an odd multiple of ⅛ of a wave length of the signal voltage and means for applying a pump voltage to said variable capacitance to vary the capacitance thereof at a frequency twice that of said given frequency, the magnitude of said pump voltage applied to each of said resonant circuits being less than a threshold value at wihch oscillations are sustained in the resonant circuits, said signal and pump voltages having relative phases for providing parametric amplification in each of said resonant circuits.

12. A traveling wave parametric circuit comprising a transmission line having first, second and third segments for transmitting a signal voltage having a given frequency, a first resonant circuit having a variable reactance element tuned to said given frequency and coupled to said transmission line at the junction of said first and second segments, a second resonant circuit having a variable reactance element tuned to said given frequency and coupled to said transmission line at the junction of said second and third segments, the admittance of said first segment being less than the admittance of said second segment and the admittance of said second segment being less than the admittance of said third segment, the admittances of said first and second resonant circuits being negative admittances having a value such that the admittance of the first transmission line segment is equal to the admittance of the second segment of the transmission line plus the negative admittance of the first resonant circuit and the admittance of the second segment of the transmission line is equal to the admittance of the third segment of the transmission line plus the negative admittance of the second resonant circuit, and means for applying a pump voltage to said variable reactance element for varying the reactance of said element at a frequency twice that of said given frequency.

13. A traveling wave parametric circuit comprising a first transmission line for transmitting a given frequency and having a given admittance, a second transmission line connected to said first transmission line so as to form a common junction for transmitting said given frequency and having an admittance substantially different from that of said given admittance, a resonant circuit having a variable reactance element tuned to said given frequency and coupled to said first and second transmission lines at the junction thereof, said resonant circuit having a negative admittance such that the admittance of said first transmission line is equal to the admittance of said second transmission line plus the negative admittance of said resonant circuit, and means for applying a pump voltage to said variable reactance element to vary the reactance of said variable reactance element at a frequency substantially twice that of said given frequency.

14. A traveling wave circuit as set forth in claim 12 wherein said first and second resonant circuits are spaced apart along said transmission line by a distance equal to an odd multiple of ⅛ of a wave length of the signal voltage.

15. A traveling wave circuit as set forth in claim 12 wherein said first and second resonant circuits are spaced apart along said transmission line by a distance equal to an odd multiple of ¼ of a wave length of the signal voltage.

References Cited in the file of this patent

UNITED STATES PATENTS 3,008,089 Uhlir ---------------- Nov. 7, 1961

3,016,492 Landauer ------------- Jan. 9, 1962
3,040,267 Seidel ---------------- June 19, 1962
3,045,189 Engelbrecht ----------- July 17, 1962
3,051,908 Anderson et al. --------- Aug. 28, 1962
3,076,149 Knechtli et al. --------- Jan. 29, 1963

OTHER REFERENCES

Honey et al.: "IRE Transactions on Microwave Theory and Techniques," May 1960, pages 351–361.

Conrad et al.: "Proceedings of the IRE," May 1960, pages 939–940.

Kamal: "Proceedings of the IRE," August 1960, pages 1424–1430.